Nov. 22, 1966   K. D. LANTZ   3,286,408
DEVICE FOR CORRECTION OF PRODUCTION FAULTS IN GEAR-WHEEL TEETH
Filed June 30, 1964

Inventor
Kurt D. Lantz
by Sommers & Young
Attorneys

United States Patent Office 3,286,408
Patented Nov. 22, 1966

3,286,408
DEVICE FOR CORRECTION OF PRODUCTION FAULTS IN GEAR-WHEEL TEETH
Kurt D. Lantz, Thorsvagen 22, Ektorp, Sweden
Filed June 30, 1964, Ser. No. 379,207
1 Claim. (Cl. 51—105)

This application is a continuation-in-part of my application Serial No. 164,800 filed January 8, 1962, now abandoned.

The present invention relates to means for correcting production faults in the teeth of gear wheels. The reason for such a correction is that, in order to secure a satisfactory function of gear transmissions—especially high-speed assemblies—it is necessary that the teeth of the gear involved are cut with a high degree of accuracy, ensuring a correct tooth pitch and shape of contact surfaces.

Deviations from the correct values of pitch may be kept within very close tolerances, even with existing method of machining. Yet, however, a certain amount of deviation can, neverthless, occur and if there are several such deviations in substantially the same direction, then an accumlated fault may appear, causing an irregular running of the gear and increasing the stresses to which certain teeth or groups of teeth are subjected, with the result that the teeth may be overstrained.

The present invention has for its object to provide a device for correcting the manufacturing faults appearing in the teeth of gear wheels. More particularly, the invention relates to the type of such correction devices which includes a tool wheel in the shape of a pinion the teeth of which are brought into mesh with the teeth to be corrected, and in which the gear, the teeth of which are to be corrected, and said pinion are each connected to an individual one of two driving units mechanically or electrically intergrated in such a way as to maintain a predetermined relationship between their rotational speeds, means being provided to permit mutual adjustment of said units so as to secure any desired clearance between the tooth flanks of the pinion and the gear to be corrected.

A feature of the invention involves that one at least of said power sources is coupled in the respective driven wheel through a "creep" gear so arranged that its principal faults rotate during the correcting operation at a speed differing from that of said driven wheel.

Figure 1:
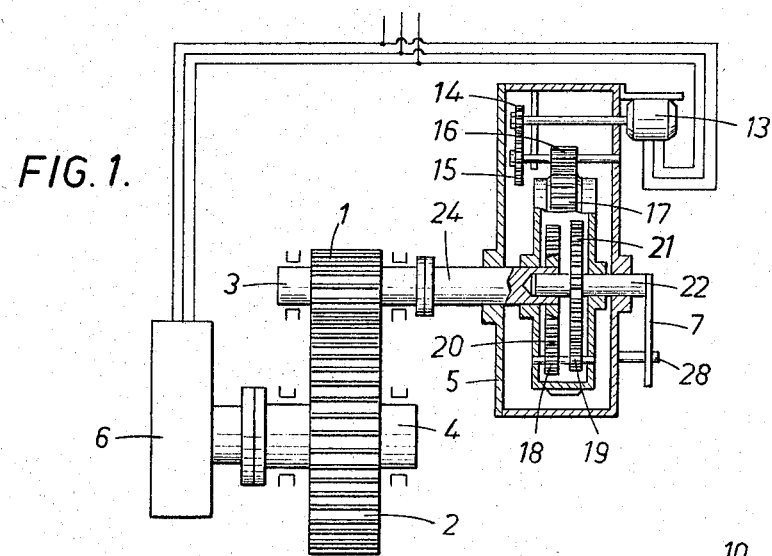
Figure 2:
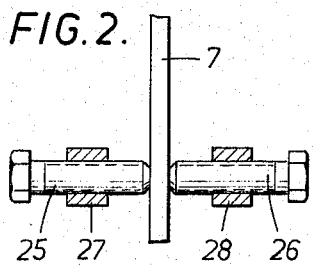

An embodiment of a device according to the invention is illustrated in the accompanying drawing in which, FIG. 1 is an elevation of the device and, FIG. 2 is a detailed view of a locking mechanism of FIG. 1.

Figure 3:
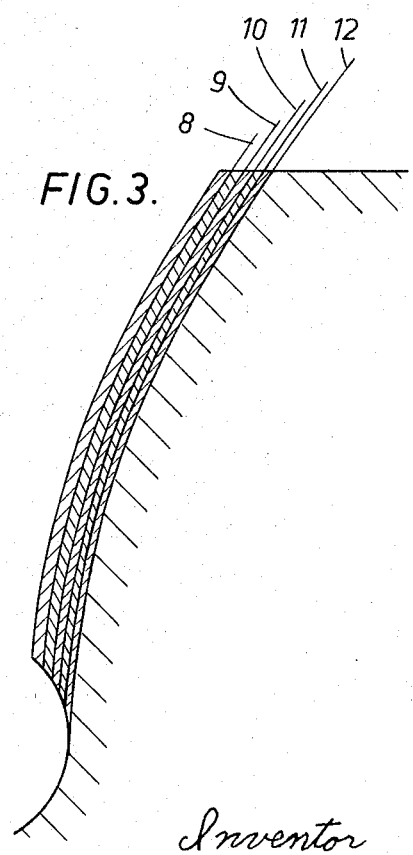

FIG. 3 is a sectional view of a detail of a tooth on a larger scale.

With reference to the drawing the numeral 1 designates a tool wheel in the shape of a pinion in mesh with a gear wheel 2 the teeth of which are to be corrected. Shafts 3 and 4 of said pinion and said gear wheel, respectively, are coupled to drive units 5 and 6, respectively. Said units, which may be of mechanical or electrical nature are coupled together, as by electrical means, so that their rotational speeds will maintain a predetermined relationship with relation to each other. If desired, the drive units may be provided with exchangeable transmission gears to allow the ratio between the two gears to be fixed at any predetermined value.

In the drawing the drive unit 5 is shown as a creep gear of conventional structure. The drive unit 6 may be of the same structure as the drive unit 5 except that it has no member corresponding to the lever 7 hereinafter referred to. As an alternative, the unit 6 may comprise a different drive unit coupled to the unit 5.

In accordance with FIG. 1 of the drawing there is provided an electric motor 13 for controlling the drive unit 5. Said motor rotates, by way of gear wheels 14, 15, the pinion 16 which in its turn rotates the casing 17 by meshing with a toothed rim thereon. Rotatably mounted in the casing 17 is a shaft supporting two pinions 18 and 19 in mesh with toothed wheels 20 and 21, respectively which wheels are of different diameter from each other whereby one advances relative to the other in operation. Wheel 21 is supported by a shaft 22 mounted in one side wall of casing 5 which may be locked in given angular positions with relation to the casing 5. The wheel 20 is supported by a shaft 24 rotatably mounted in the other side wall of the casing 5. To center shafts 22 and 24 with relation to each other shaft 22 is mounted with its inner end in a boring in the inner end of shaft 24.

The operation is as follows:

Upon rotation of the casing 17 by the action of the pinion 16 the pinions 18 and 19 are caused to rotate around their common shaft due to the pinion 19 meshing in the toothed wheel 21 held against rotation by means of lever 7. Owing to different ratios of gearing between the gearings 18, 20 and 19, 21, respectively, the wheel 20 will be caused to rotate.

It is thus seen that the structure is a planetary gear. The ratio of gearing will be $$\frac{n_{24}}{n_{17}} = 1 - \frac{z_{20}}{z_{18}} \cdot \frac{z_{19}}{z_{21}}$$

where $n$ is the speed of the wheels 24 and 17, respectively, and $z$ is the number of teeth of said wheels.

It is seen, that the toothed wheel 20 secured to the outgoing shaft 24 is driven by the pinion 18 which at the same time is moving around the circumference of the toothed wheel 20. As a result, the faults of the teeth of the pinion 18 and toothed wheel 20 will not be synchronized with the speed of the outgoing shaft 24 but is moving with relation thereto. The clearance between the flanks of the gears 1 and 2 is adjustable by means of a lever 7. In order to lock said lever in the angular position desired, set screws 25, 26 are provided to engage the lever from opposite sides thereof, as shown in FIG. 2. Said set screws engage threaded borings of stationary arms 27 and 28, respectively.

When it is desired to machine a gear, the ratio of gearing is set so that the pinion 1 can rotate with its teeth engaging into between those of the gear wheel 2 without being in contact therewith, the clearance being adjustable either manually or automatically. In FIG. 1 a lever is shown at 7, by means of which the pinion 1 can be turned manually with relation to gear wheel 2.

When conventional motors and gearings are used, then the latter should comprise processing gears of the familiar type, whereby errors present in the gearing (such as pitch errors, etc.) rotate processing relatively to the gear-set output shaft. During rotation the gap between the flanks of the pinion and gear wheel teeth will vary by an amount compounded of the pitch errors present in the processing gears, the pinion and the gear wheel.

The pitch errors of the pinion and the gear wheel are constant factors which will be observed regularly during each revolution, but the errors of the processing gears are not constant relatively to the output shaft, since they rotate relatively to this shaft. Thus, there will be a point where all errors are cumulative resulting in a maximum or minimum gap between the flanks of the pinion and gear wheel teeth.

Where maximum pitch error in "creep" gear 5 is F5
maximum pitch error in "creep" gear 6 is F6
maximum pitch error in the pinion 1 is F1
maximum pitch error in gear wheel 2 is F2 the gap at the stated point will be $$F5+F6+F1+F2=F$$

It is to be noted that this situation will not occur more frequently than once in 10 million revolutions of the gear wheel if gearing ratios are well chosen.

It is feasible to manufacture the "creep" gears and the pinion with such an accuracy that the sum of their errors corresponds to the error in the gear wheel. By means of lever 7 the clearance between the flanks of the pinion teeth and those of the gear wheel teeth can be adjusted so that, for instance, there will be contact between them only in cases where F2 contributes to a reduction of gap between the flanks. Thus, if an abrasive agent were introduced between the flanks only the flanks with a positive error would be ground, the error F2 being subject to the hardest grinding. Supposing F2 to be reduced to, say, half its original magnitude, then its contribution to total error F would be reduced correspondingly. If the clearance is still further reduced by means of lever 7, even faultless teeth would be sporadically ground during machining thereafter. However, the teeth having no error, that is, in which some F2 remains, would be subjected to more frequent and thus more intensive grinding.

The individual stages in the grinding of a tooth are indicated in FIG. 3 by reference numerals 8–12. The variations in magnitude depend upon the errors present in the processing gears and pinion. But the sum of machinings will be of the desired amount, since variations of the individual stages will counterbalance one another. From that it follows that the accuracy of the total machining operation will be directly proportional to the number of individual grinding operations.

The use of an abrasive agent has been mentioned above; it is evident, however, that even other methods may be employed, such as, for instance, the use of a pinion serving at the same time as a tool wheel, or the introduction of a special cutting or grinding wheel. Electroerosion may also be adopted.

I claim:

A device for correcting production faults of teeth of gear wheels comprising in combination, a tool gear wheel in the shape of a pinion having teeth which are adapted to be in mesh with the teeth of the gear wheel to be corrected, individual electric motors for rotating said tool gear wheel and said gear wheel to be corrected, respectively, means for electrically interconnecting said motors so as to maintain a predetermined relationship between their rotational speeds, means for allowing mutual adjustment of said motors with a view to securing any desired clearance between the flanks of co-engaging teeth of said tool gear wheel and said gear wheel undergoing correction, at least one of said motors being coupled to its respective gear wheel through a planetary gear comprising a rotatable casing having gear teeth on its outside drivingly connected with one of said motors, said casing having two gear wheels of different diameter mounted on separate co-axial shafts aligned with said tool gear wheel, a pair of pinions mounted on the same shaft in said casing meshing respectively, with said last-mentioned two gear wheels, means for holding one of said last-mentioned two gear wheels against rotation whereby the principal errors of said tool gear wheel rotate during the correcting operation at a speed differing from that of said gear wheel to be corrected.

References Cited by the Examiner
UNITED STATES PATENTS

| | | | |
|---|---|---|---|
| 1,912,216 | 5/1933 | Page | 51—26 X |
| 2,147,864 | 2/1939 | Thrun | 51—287 X |
| 2,641,088 | 6/1953 | Wilcox | 51—26 |

LESTER M. SWINGLE, *Primary Examiner.*